(12) United States Patent
Eriksson et al.

(10) Patent No.: US 8,358,678 B2
(45) Date of Patent: Jan. 22, 2013

(54) FREQUENCY HOPPING OFFSETTING FOR MULTIPLE USERS REUSING ONE SLOT (MUROS)

(75) Inventors: Stefan Eriksson, Bromma (SE); Miguel Lopez, Solna (SE); Mårten Sundberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1000 days.

(21) Appl. No.: 12/346,619

(22) Filed: Dec. 30, 2008

(65) Prior Publication Data

US 2009/0279587 A1    Nov. 12, 2009

Related U.S. Application Data

(60) Provisional application No. 61/050,877, filed on May 6, 2008.

(51) Int. Cl.
*H04B 1/713* (2011.01)
(52) U.S. Cl. ........................................ 375/133
(58) Field of Classification Search ............ 375/130, 375/132, 133, 134, 135, 136, 137
See application file for complete search history.

(56) References Cited

U.S. PATENT DOCUMENTS

| | | | |
|---|---|---|---|
| 6,233,270 B1 | 5/2001 | Craig et al. | |
| 6,606,500 B1 | 8/2003 | Kronestedt | |
| 6,845,123 B1 | 1/2005 | Nyberg et al. | |
| 6,882,847 B2 | 4/2005 | Craig et al. | |
| 7,010,015 B2 | 3/2006 | Hervey, Jr. et al. | |
| 7,421,005 B2 * | 9/2008 | Craig et al. | 375/132 |
| 7,724,803 B2 * | 5/2010 | Dhar et al. | 375/132 |
| 2009/0311963 A1 * | 12/2009 | Haverty | 455/63.1 |

OTHER PUBLICATIONS

Frequency Hopping Schemes for MUROS, 3GPP TSG GERAN WG1 Ad Hoc, Apr. 8-11 2008, p. 1-6.*
International Search Report and Written Opinion mailed Jul. 29, 2009in corresponding PCT Application PCT/SE2009/000193.
Telefon AB LM Ericsson, "Frequency Hopping Schemes for MUROS", 3GPP TSG GERAN #38, XP-002536671, May 12-16, 2008, pp. 1(6)-6(6).
Telefon AB LM Ericsson, "Frequency Hopping Schemes for MUROS", 3GPP TSG GERAN WG1 Ad Hoc, XP-002536669, Apr. 8-11, 2008, pp. 1(6)-6(6).
Ericsson, "Enhanced Frequency Hopping in GERAN", 3GPP TSG GERAN #6, XP-002536670, 26-31 Aug. 31, 2001, pp. 1(1)-12(12).
3GPP TSG GERAN#36, *Multi-User Reusing-One-Slot (MUROS)*, Vancouver, Canada, Nov. 12-16, 2007.
3GPP TSG GERAN #33, *Voice Capacity Evolution with Orthogonal Sub Channel*, Seoul, South Korea, Feb. 12-16, 2007.

* cited by examiner

*Primary Examiner* — Khanh C Tran
(74) *Attorney, Agent, or Firm* — Nixon & Vanderhye P.C.

(57) ABSTRACT

First and second groups of mobile terminal communications in a cell are defined. A basic frequency hopping sequence for both groups is identified. An offset from the basic hopping sequence is determined for each mobile terminal communication in the first and second groups and is used along with the basic frequency hopping sequence to generate an assigned frequency hopping sequence for each mobile terminal. Some of the assigned frequency hopping sequences overlap such that a first communication from the first group and a second communication from the second group simultaneously use the same time-frequency radio resource during one hop in their corresponding assigned frequency hopping sequences. The first and second mobile terminal communications use a different time-frequency radio resource during another hop in their respective assigned frequency hopping sequence thereby varying the offset for each mobile terminal communication in the second group to improve interference diversity between the two groups for each hop.

23 Claims, 8 Drawing Sheets

| Freq | | | | | | | | | |
|---|---|---|---|---|---|---|---|---|---|
| 12 | | | | | | | | | |
| 11 | | | | | | | | | |
| 10 | | M2 | M3 | M1 | M2 | M3 | M1 | | |
| 9 | | | | | | | | | |
| 8 | | | | | | | | | |
| 7 | M3 | M1 | M2 | M3 | M1 | M2 | M3 | M1 | |
| 6 | | | | | | | | | |
| 5 | | | | | | | | | |
| 4 | M2 | M3 | M1 | M2 | M3 | M1 | M2 | M3 | |
| 3 | | | | | | | | | |
| 2 | | M3 | M2 | M1 | M3 | M2 | M1 | M2 | |
| 1 | M1 | | | | | | | | |
| | 1 | 2 | 3 | 4 | 5 | 6 | 7 | 8 | ... |

Time

Fig. 2

| Freq | | | | | | | | |
|---|---|---|---|---|---|---|---|---|
| 12 | | | | | | | | |
| 11 | | | | | | | | |
| 10 | M2 | | M1 | | | | | M4 |
| 9 | | | | | | | | M1 |
| 8 | | | | | | | | |
| 7 | M3 | | M3 | | M3 | | M3 | |
| 6 | | M2 | | M2 | | M2 | | |
| 5 | M2 | M5 | | M5 | | M5 | | M3 |
| 4 | | | M2 | | M2 | | M2 | M2 | M5 |
| 3 | | M3 | | M3 | | M3 | | |
| 2 | | | | | M1 | M4 | M1 | M4 |
| 1 | M1 | M4 | M1 | M4 | | | | |
| | 1 | 2 | 3 | 4 | 5 | 6 | 7 | 8 |

Time

FREQUENCY HOPPING OFFSETTING FOR MULTIPLE USERS REUSING ONE SLOT (MUROS)

PRIORITY APPLICATION

This application claims the priority benefit of U.S. provisional application 61/050,877, entitled "Frequency Hopping Schemes for Orthogonal Sub-channels," filed on May 6, 2008, the contents of which are incorporated here by reference.

TECHNICAL FIELD

The technology pertains to the field of telecommunications, and particularly, to frequency hopping techniques employed in cellular telecommunications systems.

BACKGROUND

Frequency hopping is employed in some cellular, radio telecommunications systems, such as the Global System for Mobile Communication (GSM), to improve system performance. Frequency hopping improves system performance by introducing frequency diversity and interference diversity, and as a result, increases the capacity of a cellular network. In a radio telecommunications system that employs frequency hopping, typically a frequency hopping sequence is allocated to a mobile radio terminal at call setup. Frequency diversity is achieved by transmitting each radio telecommunications signal on the sequence of frequencies over time. Each radio signal is transmitted over a sequence of frequencies because radio signals are often subject to amplitude variations called Rayleigh fading. Generally, in any given instance Rayleigh fading negatively impacts radio signals carried on some frequencies more so than other frequencies. Thus, transmitting a radio telecommunications signal over the sequence of different frequencies can increase the likelihood that the signal will be received correctly, as it is unlikely that Rayleigh fading will significantly negatively impact each and every frequency over which the radio telecommunications signal is being transmitted. This benefit exists for signals containing redundancy that enables bit errors experienced during the Rayleigh fading dips to be corrected. Accordingly, signal quality is improved and overall system performance is enhanced.

In addition to fading, a radio signal is often subject to varying degrees of interference caused by traffic (e.g., from closely located mobile terminals or base stations) on the same frequency (i.e., co-channel interference) and traffic on an adjacent frequency (i.e., adjacent channel interference). If co-channel and/or adjacent channel interference is substantial, the signal quality associated with the radio signal may be severely impacted. In theory, frequency hopping, through the introduction of interference diversity, spreads the co-channel and adjacent channel interference among numerous mobile terminals so that the co-channel and adjacent channel interference experienced by a particular end-user is diversified. The overall effect is to raise the signal quality across the network, thereby improving overall system performance.

In order to avoid severe interference between closely-located mobile stations (e.g., mobile stations connected to the same base station) using the same set of frequencies, orthogonal frequency hopping sequences are allocated to these mobile stations. Two frequency hopping sequences S1 and S2 are orthogonal if $S_1(k) \neq S_2(k)$ for all time steps k. Orthogonality is depicted by the notation $S_1 \perp S_2$. The two frequency hopping sequences $S_1$ and $S_2$ are partially orthogonal if the collision probability $P(S_1(k)=S_2(k))=p$ for some $0<p<1$, as depicted by the notation $S_1 \perp_p S_2$.

Frequency hopping sequences can be derived from a reference frequency hopping sequence that is established for the entire system or a part of the system, e.g. a cell. Typically (e.g., as in GSM), the reference frequency hopping sequence is a cyclic or pseudo-random sequence determined by cell specific parameters (e.g., Hopping Sequence Number "HSN"). That is, a mobile station, at handover or call set-up, is informed of the cell specific parameter determining the reference frequency hopping sequence and is in addition assigned mobile-specific parameters (e.g., an available frequency offset) associated with the cell in which the mobile station is operating. The mobile station hops through a sequence of frequencies that are, over time, offset from the reference frequency hopping sequence by a fixed amount that is equal to its assigned frequency offset. In accordance with the GSM standard, each frequency offset is referred to as a Mobile Allocation Index Offset (MAIO). Depending on the values of these two parameters (HSN and MAIO, for instance) and the parameter that clocks the frequency hopping sequences through time (the time division multiple access (TDMA) frame number, for example), frequency hopping sequences used by two mobiles may be either identical, orthogonal, or non-orthogonal but with random collisions, so that interference diversity is achieved. Allocating different constant frequency offsets to mobile stations at call setup or handover is an attempt to obtain orthogonality.

Commonly-assigned U.S. Pat. No. 6,233,270 discloses a mobile station hopping from one frequency to another as a function of the reference frequency hopping sequence plus a frequency offset hopping sequence which it has been assigned. The frequency offset hopping sequence is different in each of the synchronized cells, thereby creating interference diversity. U.S. Pat. No. 6,233,270 thus describes a method to obtain interference diversity between synchronized cells that have been allocated a same frequency hopping sequence.

Interference diversity within a cell can also be important for networks in which either intra-cell co-channel or intra-cell adjacent channel interference occurs. Assume, for example, a typical GSM frequency hopping method using two basic parameters: the hopping sequence number (HSN) and the frequency offset (MAIO) from the basic frequency hopping sequence. Frequency offset hopping sequences should be generated so that, depending on the input parameters, two frequency offset sequences are either orthogonal with variable frequency offset difference, or non-orthogonal with random collisions so that interference diversity can be provided by the frequency offset sequences alone (irrespective of the basic frequency hopping sequence). Commonly-assigned U.S. Pat. No. 7,421,005 describes a frequency hopping sequence generator system that generates variable frequency offsets to determine a frequency hopping sequence for use in communication between a mobile station and a network node in an effort to provide interference diversity within a cell based on frequency offset.

Recently, a technique called Multiple User Reusing One Slot (MUROS) is being discussed for use in TDMA type systems. MUROS allows two or more mobile terminals to share the same carrier frequency during the same time slot, both in the downlink and in the uplink. In a first MUROS approach, Quadrature Phase Shift Keying (QPSK) modulation is used in the DL (downlink), and two user signals are mapped to the real and imaginary parts of the baseband signal. The real part is call an I sub-channel, and the imaginary part is called the Q sub-channel. Under some conditions, the I and Q sub-channels are orthogonal, and therefore, named Orthogonal Sub-Channels (OSC). Another approach, called Adaptive Symbol Constellation, proposes using a hybrid quaternary modulation in the downlink (DL). The Adaptive Symbol Constellation concept is an extension of OSC. In the uplink (UL), Gaussian minimum shift keying (GMSK) modulation is used for both approaches. Two GMSK-modulated signals from two mobile stations are transmitted on the same timeslot and carrier frequency (or sequence of frequencies in case frequency hopping is deployed). On the receiver side, multi-user detection or interference cancellation techniques can be used to demodulate the two signals. Even though legacy mobile terminals are supported by the first approach, new mobile terminal types will still be required because a new training sequence set is introduced. Moreover, the frequency hopping standardized for GSM can be applied to the QPSK-modulated signal in the downlink and to each of the GMSK-modulated signals in the uplink. In that case, the two sub-channels will use the same frequency hopping sequence, and hence, the same frequency and timeslot at any given instant in time.

Thus, in MUROS, two (or more) mobile terminal communications share one radio resource. Even though OSC implies the existence of orthogonality, the two mobile terminal signals are not perfectly orthogonal because time dispersion on the channel (due to multipath propagation on the radio channel and filters in the transmitter and receiver) causes leakage between the I and Q sub-channels. For the downlink, this means the two mobile terminal signals interfere with one another. For the uplink, the phase difference between the two mobile terminal signals is random, and thus, orthogonality is not achieved even in the absence of time dispersion. The result of this lack of orthogonality is interference between the two sub-channels that degrades the performance (e.g., speech quality) for each user. Even if discontinuous transmission (DTX) is used, the inter-sub-channel interferer is sometimes present and sometimes not. Performance decreases in the time periods when the interferer is present.

Further, in a scenario in which OSC is used for only a subset of the channels in a cell (e.g., due to the current cell load, there is no need to multiplex two users on all channels), users on OSC channels will experience worse link quality (e.g., coverage) than users on non-shared channels.

Accordingly, there is a need for interference diversity in these MUROS type settings.

SUMMARY

First and second groups of mobile terminal communications in a cell are defined. A basic frequency hopping sequence for both groups is identified. An offset from the basic frequency hopping sequence is determined corresponding to each mobile terminal communication in the first and second groups and is used along with the basic frequency hopping sequence to generate an assigned frequency hopping sequence for each mobile terminal communication. Some of the assigned frequency hopping sequences overlap such that a first communication from the first group and a second communication from the second group simultaneously use the same time-frequency radio resource during one hop in their corresponding assigned frequency hopping sequences. The first and second mobile communications use a different time-frequency radio resource during another hop in their corresponding assigned frequency hopping sequence to improve interference diversity between the two groups for each hop.

In a non-limiting example implementation, each offset associated with the first group of mobile terminal communications is a static offset value that does not change during the assigned hopping sequence, and each offset associated with the second group of mobile terminal communications is a variable offset value that changes during the assigned hopping sequence. The variable offset value for each mobile terminal communication in the second group is preferably generated in accordance with an offset hopping pattern. The radio network signals information to the mobile terminals in the second group that permits each mobile terminal in the second group to determine the variable offset value for its corresponding offset during each hop in the assigned hopping sequence.

In a non-limiting example implementation, at most two mobile terminal communications simultaneously use the same time-frequency radio channel during one hop, the first group includes three or more mobile terminal communications, and the second group includes two or more mobile terminal communications.

The technology may be used for mobile terminal communications in the downlink direction from a radio network to the first and second groups of mobile terminals and/or for mobile terminal communications in the uplink direction from the first and second groups of mobile terminals to the radio network.

In a non-limiting MUROS type example, a first mobile communication from the first group uses a first sub-channel of the same time-frequency radio resource during the one hop, and a second mobile communication from the second group uses a second sub-channel of the same time-frequency radio resource during the one hop. The first and second sub-channels are at least partially orthogonal to each other. The variable offset values improve the fairness of distribution of inter-sub-channel interference among the first and second groups of mobile terminal communications. The frequency hopping sequence is determined using a hopping sequence number (HSN), a number of hopping frequencies, and a mobile allocation index offset (MAIO). The mobile terminal communications in the first group are each assigned a corresponding constant mobile allocation index offset (MAIO) for the assigned frequency hopping sequence, and the mobile terminal communications in the second group are each assigned a corresponding variable MAIO that changes during the assigned frequency hopping sequence.

From the perspective of a mobile radio terminal in the second group, the mobile terminal determines the basic frequency hopping sequence to be used for communication with a radio network. The mobile terminal receives radio resource information from the radio network and determines a working frequency hopping sequence using that radio resource information based on a variable offset value from the basic frequency hopping sequence. For one hop in the working frequency hopping sequence, the mobile radio terminal simultaneously uses the same time-frequency radio resource as another mobile radio terminal in the first group. For another hop in the working frequency hopping sequence, the mobile radio terminal simultaneously uses the same time-frequency radio resource as a different mobile radio terminal in the first group. The variable offset value changes during the assigned hopping sequence.

The technology provides several advantages. First, it increases the interference diversity by spreading out inter-sub-channel interference among most or all of the mobile terminal communications. Second, in a fractionally-loaded cell, (i.e., less than two mobile terminal communications per timeslot), radio link performance degradation due to sub-channel multiplexing is spread out among more mobile terminal communications, thereby reducing the performance loss for each individual mobile terminal communication. Third, the number of frequencies in a cell to which the technology may be applied can be readily modified by changing the number of offsets to hop over. Because the same frequency hopping sequence is used in both sub-channels of the time-frequency radio resource, the technology can be applied both to cells using baseband hopping and synthesizer hopping. In baseband hopping, one unique frequency is allocated to each transmitting entity, limiting the number of frequencies in a cell to the number of transmitting entities, while in synthesizer hopping, the frequency on each transmitting entity can change, so there is no restriction to the number of frequencies that can be used in a cell.

BRIEF DESCRIPTION OF THE DRAWINGS

FIG. 2 is a diagram showing an example of frequency hopping;

FIG. 3 is a diagram that shows an example of frequency hopping using OSC;

FIG. 4 is a diagram similar to FIG. 3 but that also shows an example of MAIO hopping for a second group of mobiles;

DETAILED DESCRIPTION

In the following description, for purposes of explanation and not limitation, specific details are set forth such as particular architectures, interfaces, techniques, etc. However, it will be apparent to those skilled in the art that the claimed technology may be practiced in other embodiments that depart from these specific details. That is, those skilled in the art will be able to devise various arrangements which, although not explicitly described or shown herein, embody the principles of the claimed technology and are included within its spirit and scope. In some instances, detailed descriptions of well-known devices, circuits, and methods are omitted so as not to obscure the description of the present invention with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein represent conceptual views of illustrative circuitry embodying the principles of the technology. Similarly, it will be appreciated various processes described may be substantially represented in a computer-readable medium and can be executed by a computer or processor.

The functions of the various elements including functional blocks labeled or described as "processor" or "controller" or "computer" may be provided through the use of dedicated hardware as well as hardware capable of executing software. When provided by a processor, the functions may be provided by a single dedicated processor, by a single shared processor, or by a plurality of individual processors, some of which may be shared or distributed. Moreover, a "processor" or "controller" may include, without limitation, digital signal processor (DSP) hardware, ASIC hardware, read only memory (ROM), random access memory (RAM), and/or other storage media.

Figure 1:
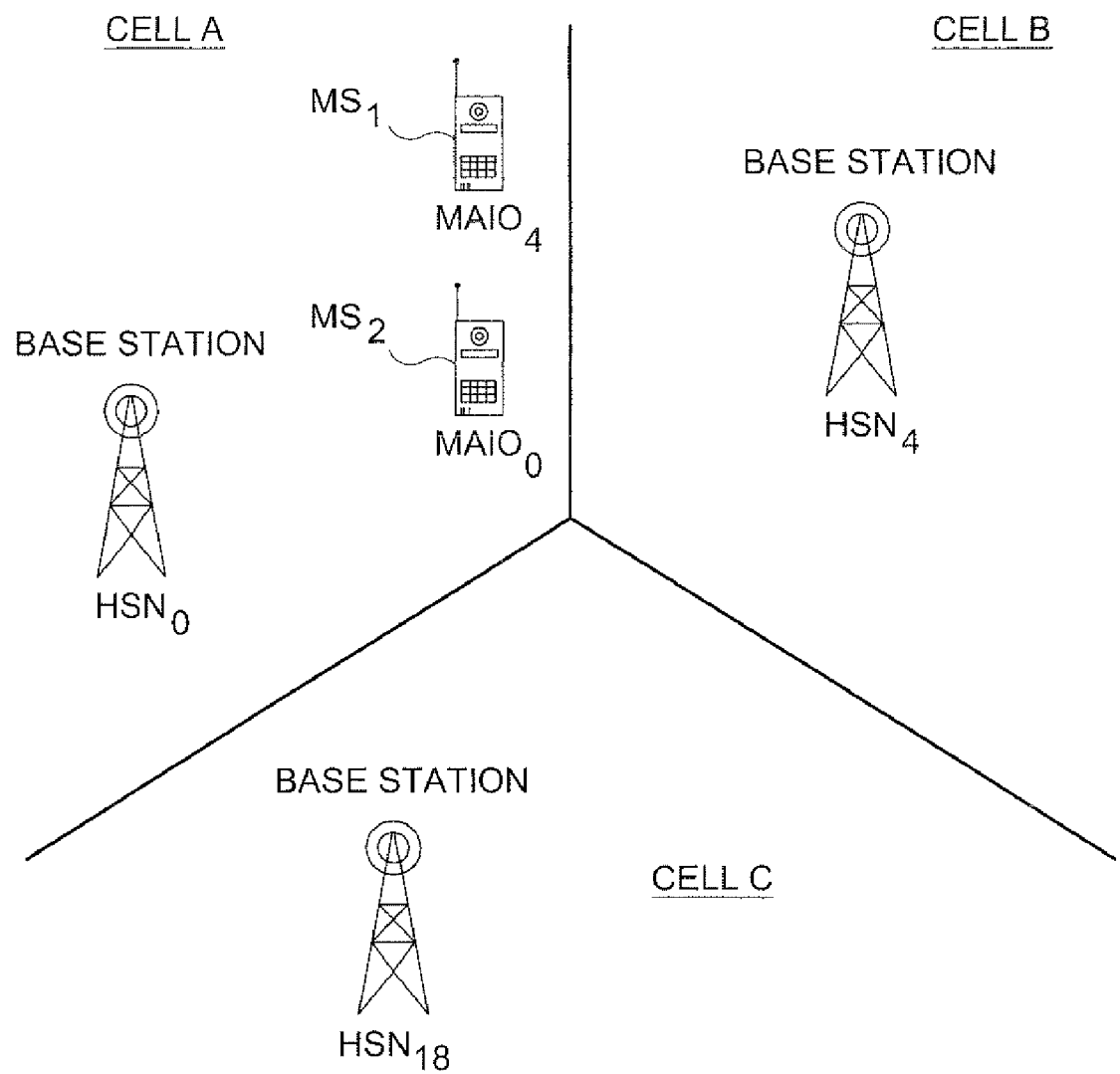
FIG. 1 illustrates a telecommunications network that uses frequency hopping sequences in each cell.

FIG. 1 illustrates an example GSM-based telecommunications network that uses frequency hopping sequences, with each cell being assigned a particular hopping sequence number (HSN). Three cells A, B, and C are assigned HSN0, HSN4, and HSN18, respectively. If, for example, there are 16 frequencies, f0 through f15, available for frequency hopping in each of cells A, B, and C, the sequence of frequencies associated with HSN0 might include the following sequence: f1, f5, f12, f9, f6, f7, f0, f15, f12, f4, and f1. Two mobile terminals are operating in cell A. The first mobile station (MS1) is assigned Mobile Allocation Index Offset MAIO4, while the second mobile station (MS2) is assigned MAIO0. Accordingly, the frequency hopping sequence for MS1 is defined, in whole or in-part, by HSN0 and MAIO4. Assuming MAIO4 represents a frequency offset of +4 frequency channels, MS communicates over a sequence of frequencies that includes the following sequence: f5, f9, f0, f13, f10, f11, f4, f3, f0, f8, and f5. It then follows that MS2, which is assigned MAIO0, communicates over a sequence of frequencies that includes the following sequence: f1, f5, f12, f9, f6, f7, f0, f15, f12, f4, and f1.

To this example frequency hopping system, MUROS may be applied to increase the capacity of the system. For purposes of illustration and not limitation, the following description is provided in the non-limiting example MUROS context of a GSM type system. In MUROS, multiple radio users may be allocated the same radio resource for communication on the same frequency during the same time period. Each radio resource, which is defined by a time interval and a frequency, may be used to support multiple simultaneous mobile terminal communications. In an example, non-limiting embodiment, mobile terminal users (for convenience referred to simply as "users") in a cell are divided into two sets or groups. However, more than two sets or groups may be used. Both of the first and second groups of mobile terminal communications use the same basic frequency hopping sequence, where each hop in the basic frequency hopping sequence corresponds to a time-frequency radio resource. Each mobile terminal communication in the first and second groups has a corresponding offset from the basic frequency hopping sequence. The offset for each mobile terminal communication is then used to generate an assigned frequency hopping sequence corresponding to that mobile terminal communication.

At least some of the assigned frequency hopping sequences overlap such that a first mobile terminal communication from the first group and a second mobile terminal communication from the second group simultaneously use the same time-frequency radio resource during one hop in their corresponding assigned frequency hopping sequences. To aid in description, each mobile terminal communication sharing the same time-frequency radio resource is defined to be using a sub-channel. So if two mobile terminal communications are simultaneously using the same time-frequency radio resource, then that radio resource includes two sub-channels. For the non-limiting examples below in the description, the two sub-channels are preferably orthogonal making them orthogonal sub-channels (OSCs). But the sub-channels do not have to be orthogonal.

It is desirable to have interference diversity between mobile terminal communications so that a mobile terminal communication on one sub-channel is multiplexed with different mobile terminal communication from transmission time interval-to-transmission time interval. Although such diversity can be achieved by using different frequency hopping sequences on the different sub-channels, the technology developed by the inventors achieves interference diversity while using the same frequency hopping sequence for the different sub-channels.

A mobile terminal communication in a cell associated with a base station is allocated a frequency hopping sequence (FHS) at call setup or handover, The frequency hopping sequence may be determined by a set of frequencies used for frequency hopping in the cell. In the GSM example like that in FIG. 1, the frequency hopping sequence may be determined by the Mobile Allocation (MA), its cardinality N, and two hopping sequence parameters. The first parameter is the Hopping Sequence Number (HSN), as shown in FIG. 1, which is a base station parameter that determines the basic hopping sequence in the cell. The second parameter is the Mobile Allocation index Offset (MAIO) that ranges from 0 through L−1, where L is the number of base station radio transceivers used in the cell. The MAIO is allocated to a call at call setup and gives a frequency offset for a specific mobile terminal communication from the basic frequency hopping sequence designated by the HSN. An HSN equal to 0 gives a cyclic sequence, whereas HSN 1 to 63 give different pseudo-random sequences. The time counter in GSM is the Frame Number (FN). The same frame number is used by all the mobile terminal communications connected to one base station, and it is incremented by one for each time division multiple access (TDMA) frame.

In the following example, one or more mobile terminal communications in a first group assigned to a first orthogonal sub-channel (OSC) are allocated a frequency hopping sequence (FHS) and a static MAIO offset that does not change during the duration of a call. One or more calls in a second group allocated to a second sub-channel are assigned an FHS defined by the same HSN as the users in the first sub-channel and a time varying MAIO that changes during the duration of a call. In a preferred embodiment, only one communication from each group is assigned so that there are only two mobile terminal communications simultaneously using the same time-frequency radio resource. The time varying MAIO for the mobile terminal communications in the second group may be changed every frame number FN. Thus, even though all the mobile terminal communications in the first and second groups use the same set of hopping frequencies, the mobile terminal communication on the second OSC sub-channel does not interfere with the mobile terminal communication on the first OSC sub-channel during consecutive TDMA frames because the mobile terminal communications in the second group on the second sub-channel use a time varying MAIO. One example way to vary the MAIO is to use a hopping MAIO pattern.

In this non-limiting example, the static MAIO values used for the first group of mobile terminal communications may be determined as in GSM. See, e.g., 3GPP TFS 45.002, the disclosure of which is incorporated here by reference. All the mobile terminal communications in the first group are assigned one frequency hopping sequence defined by a Hopping Sequence Number (HSN) as well as the same set of frequencies defined by the Mobile Allocation (MA). Each mobile terminal communications in the first group is assigned a Mobile Allocation Index Offset (MAIO) that is unique within its group to enable support for legacy mobile terminals to be multiplexed with mobile terminals supporting OSC on the same time slot, The second set of mobile terminal communications are assigned the same HSN and the same MA. But instead of using a constant MAIO per mobile terminal, the mobile terminal communications in the second group use a changing MAIO. In a preferred but non-limiting example, the mobile terminals in the second group "hop" between changing MAIOs in a pre-determined manner. A non-limiting example of how to determine hopping MAIOs for the second group is now described.

Assume an MAIO can take values in the set $\{0, 1, \ldots, N-1\}$. Denote by $S_N$ set of all permutations of $\{0, 1, \ldots, N-1\}$. In other words, an element $\sigma \in S_N$ is a permutation of the set of N integers $\{0, 1, \ldots, N-1\}$. The length of the predetermined MAIO hopping sequence is chosen to be an arbitrary positive integer M. A MAIO hopping sequence is defined by a set of M elements $\sigma_0, \ldots, \sigma_{M-1}$ of $S_N$. Repetitions are allowed meaning that it is possible to choose $\sigma_m = \sigma_n$ for $m \neq n$. Given a time specified by the counter FN, the MAIO for the i-th call assigned to the second OSC sub-channel is:

$$MAIO_{FN}(i) = \sigma_{FN \bmod M}(i), 0 \leq i \leq N-1. \quad (1)$$

Here, mod denotes the arithmetic modulo operator. Since the same frequency hopping sequence is used for the different user groups, it is guaranteed that at most two users hop onto the same frequency and timeslot at any time instant.

An overall non-limiting numerical example is now provided under the following conditions. The frequency group includes 12 frequencies numbered 1, 2, . . . , 12. A ⅓ frequency reuse is used. In the given cell, frequencies {1, 4, 7, 10} are used corresponding to the MA, and the base station uses three transceivers (TRXs) for the cell which means that three MAIO values can be used.

First, consider a case where OSCs are not used. Assume that, on a given radio resource corresponding to a time interval and frequency in this example, three mobile stations, M1, M2 and M3, are active in the cell. They are given the parameters shown in Table 1 below. The length of the hopping sequences are assumed to be eight for illustrative purposes only and do not reflect actual hopping sequences.

TABLE 1

|  | M1 | M2 | M3 |
| --- | --- | --- | --- |
| MA | {1, 4, 7, 10} | {1, 4, 7, 10} | {1, 4, 7, 10} |
| Basic hopping sequence | [0, 2, 1, 3, 2, 0, 1, 3] | [0, 2, 1, 3, 2, 0, 1, 3] | [0, 2, 1, 3, 2, 0, 1, 3] |
| MAIO | 0 | 1 | 2 |
| Frequency sequence | [1, 7, 4, 10, 7, 1, 4, 10, . . . ] | [4, 10, 7, 1, 10, 4, 7, 1, . . . ] | [7, 1, 10, 4, 1, 7, 10, 4, . . . ] |

In the frequency hopping illustrated in FIG. 2, not all frequencies are used in the cell at a certain time instance because the cell only has three transceivers, and thus, only three possible communication frequencies.

Next, consider an example using OSCs. Assume that two more mobile terminals are present in the cell, M4 and M5 and that all five mobile terminals are assigned parameters as shown in Table 2. Again, the length of the hopping sequences is assumed to be eight and do not reflect actual hopping sequences.

The usual matrix notation for permutations is employed where the k-th element of the first row is mapped to the k-th element in the second row.

The MAIO for each call allocated to the second sub-channel is given by equation (1). There are two calls corresponding to i=0, i=1 assigned to the second OSC sub-channel. Assuming for simplicity that the time counter FN starts at FN=0, the mobile station M4 from the second group uses the following sequence of MAIO's:

$$\sigma_0(0),\sigma_1(0),\sigma_2(0),\sigma_0(0),\sigma_1(0),\sigma_2(0),\ldots$$

TABLE 2

|  | M1 | M2 | M3 | M4 | M5 |
|---|---|---|---|---|---|
| MA | {1, 4, 7, 10} | {1, 4, 7, 10} | {1, 4, 7, 10} | {1, 4, 7, 10} | {1, 4, 7, 10} |
| Basic hopping sequence | [0, 2, 1, 3, 2, 0, 1, 3] | [0, 2, 1, 3, 2, 0, 1, 3] | [0, 2, 1, 3, 2, 0, 1, 3] | [0, 2, 1, 3, 2, 0, 1, 3] | [0, 2, 1, 3, 2, 0, 1, 3] |
| MAIO | 0 | 1 | 2 | 0 | 1 |
| Sub-channel | 0 | 0 | 0 | 1 | 1 |
| Frequency sequence | [1, 7, 4, 10, 7, 1, 4, 10, . . .] | [4, 10, 7, 1, 10, 4, 7, 1, . . .] | [7, 1, 10, 4, 1, 7, 10, 4, . . .] | [1, 7, 4, 10, 7, 1, 4, 10, . . .] | [4, 10, 7, 1, 10, 4, 7, 1, . . .] |

The frequency hopping of Table 2 is illustrated in FIG. 3. FIG. 3 shows that mobile stations M1 and M4 continuously use the two sub-channels of the same channel and thereby are subject to each other's inter-sub-channel interference. Similarly, M2 and M5 continuously interfere with each other. Although M3 is not subject to any inter-sub-channel interference, consistent interference diversity is lacking.

Contrast both of these approaches with an OSC approach that uses changing MAIOs for one of the groups of users. Assume five mobile terminals in the cell allocated to the same timeslot number. The same parameters used in Table 2 apply with the exception that the second group of users, i.e., M4 and M5, hop between MAIOs. In this non-limiting example, a cyclic MAIO hopping is performed, but other hopping schemes can also be used.

The number of frequencies used at any given time in this example is N=3. The length of the MAIO hopping sequence is M=3, and the MAIO hopping sequence is determined by the following 3 cyclic permutations from equation (1):

$$\sigma_0 = \begin{pmatrix} 0 & 1 & 2 \\ 0 & 1 & 2 \end{pmatrix},$$

$$\sigma_1 = \begin{pmatrix} 0 & 1 & 2 \\ 1 & 2 & 0 \end{pmatrix},$$

$$\sigma_2 = \begin{pmatrix} 0 & 1 & 2 \\ 2 & 0 & 1 \end{pmatrix}.$$

at times FN=0, 1, 2, 3, 4, 5, . . . . Similarly, the mobile station M5 from the second group employs the following sequence of MAIO's:

$$\sigma_0(1),\sigma_1(1),\sigma_2(1),\sigma_0(1),\sigma_1(1),\sigma_2(1),\ldots$$

The MAIO Hopping Sequences in Table 3 summarize the results.

TABLE 3

|  | MAIO | | | | | |
|---|---|---|---|---|---|---|
| M4 | 0 | 1 | 2 | 0 | 1 | 2 . . . |
| M5 | 1 | 2 | 0 | 1 | 2 | 0 . . . |
|  | FN = 0 | FN = 1 | FN = 2 | FN = 3 | FN = 4 | FN = 5 . . . |

The following Table 4 shows the resulting assignment of frequency sequences. The length of the hopping sequences is again assumed to be eight and does not reflect actual hopping sequences.

TABLE 4

|  | M1 | M2 | M3 | M4 | M5 |
|---|---|---|---|---|---|
| MA | {1, 4, 7, 10} | {1, 4, 7, 10} | {1, 4, 7, 10} | {1, 4, 7, 10} | {1, 4, 7, 10} |
| Basic hopping sequence | [0, 2, 1, 3, 2, 0, 1, 3] | [0, 2, 1, 3, 2, 0, 1, 3] | [0, 2, 1, 3, 2, 0, 1, 3] | [0, 2, 1, 3, 2, 0, 1, 3] | [0, 2, 1, 3, 2, 0, 1, 3] |
| MAIO | 0 | 1 | 2 | from Table 3 | from Table 3 |
| Sub-channel | 0 | 0 | 0 | 1 | 1 |
| Frequency sequence without hopping over MAIOs | [1, 7, 4, 10, 7, 1, 4, 10, . . . ] | [4, 10, 7, 1, 10, 4, 7, 1, . . . ] | [7, 1, 10, 4, 1, 7, 10, 4, . . . ] | [1, 7, 4, 10, 7, 1, 4, 10, . . . ] | [4, 10, 7, 1, 10, 4, 7, 1, . . . ] |
| Frequency sequence applying cyclic | [1, 7, 4, 10, 7, 1, 4, 10, . . . ] | [4, 10, 7, 1, 10, 4, 7, 1, . . . ] | [7, 1, 10, 4, 1, 7, 10, 4, . . . ] | [1, 10, 10, 10, 10, 7, 4, 1, . . . ] | [4, 1, 4, 1, 1, 1, 7, 4, . . . ] |

TABLE 4-continued

| M1 | M2 | M3 | M4 | M5 |
| --- | --- | --- | --- | --- |
| hopping over MAIOs in sub-channel 1 | | | | |

Figure 4:
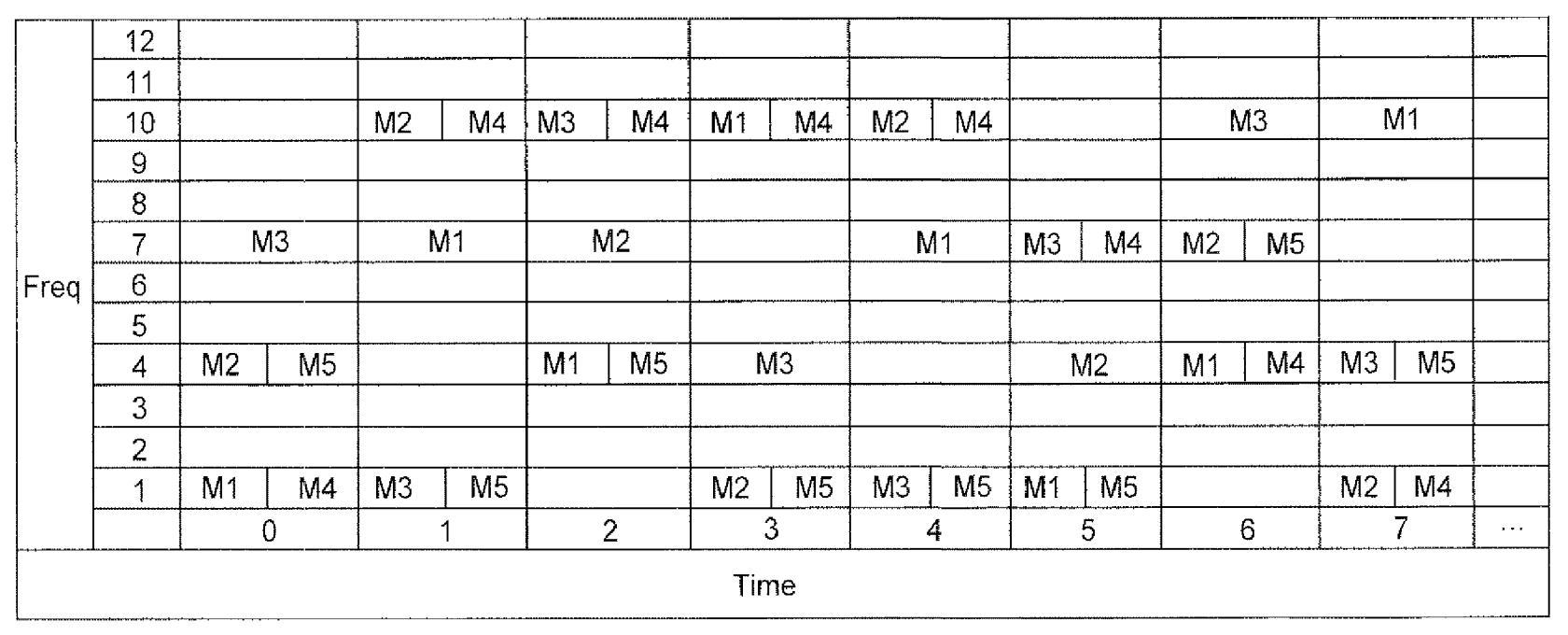

The resulting frequency hopping is illustrated in FIG. 4 which shows improved interference diversity. For example, the mobile station M1 is sometimes interfered by M4, sometimes by M5, and sometimes not interfered at all. A similar improvement is seen for mobile M2. In addition, mobile M3, which was not subject to inter-sub-channel interference in the earlier OSC approach, is now sometimes interfered by mobile M4 or mobile M5. The MAIO frequency hopping improved interference diversity fairness and consistency. Further, for a speech call, channel coding often makes the channel robust to a certain amount of interference, which means in this case that the speech quality on average likely has improved in the cell (assuming the network is well dimensioned to handle the given load).

So in this GSM-based, non-limiting example, both the first and second groups of mobile terminal communications use frequency hopping as in GSM. The second group of mobile terminal communications also use an additional hopping sequence to hop between MAIOs. The additional MAIO hopping sequence is provided to or otherwise determined by the relevant mobile station(s). For example, to generate the MAIO hopping sequence, the mobile station must be provided or otherwise know the set of allowed MAIOs (referred to as the MAIO Allocation (MAIOA)). Once the MAIOA is known, the number of MAIOs to hop over is also known. The permutations may be, for example, predetermined and stored in the mobile station. In that case, the mobile station selects the permutation corresponding to the size of the MAIOA and an additional parameter determining which MAIO hopping sequence to use. That is permutation is denoted the MAIOHSN.

Alternatively, several permutations can be defined for each given MAIOA size. In that case, another parameter must be provided to or determinable by the mobile station, i.e., a MAIO permutation number (MAIOPN).

If signaling is used, an MAIO controller in the base station (or other network node) may signal the MAIOA, the MAIOHSN, and/or the MAIOPN to the mobile station during assignment, handover, and reconfiguration. In that case, new or existing signaling messages convey the new parameters.

If the resource allocation in the cell can change during a call, then preferably the parameters are also changed during the call. Therefore, the MAIO controller preferably coordinates the change to new hopping parameters between all mobile stations, e.g., it communicates to the mobile stations a starting time after which the new parameters apply.

Figure 5:
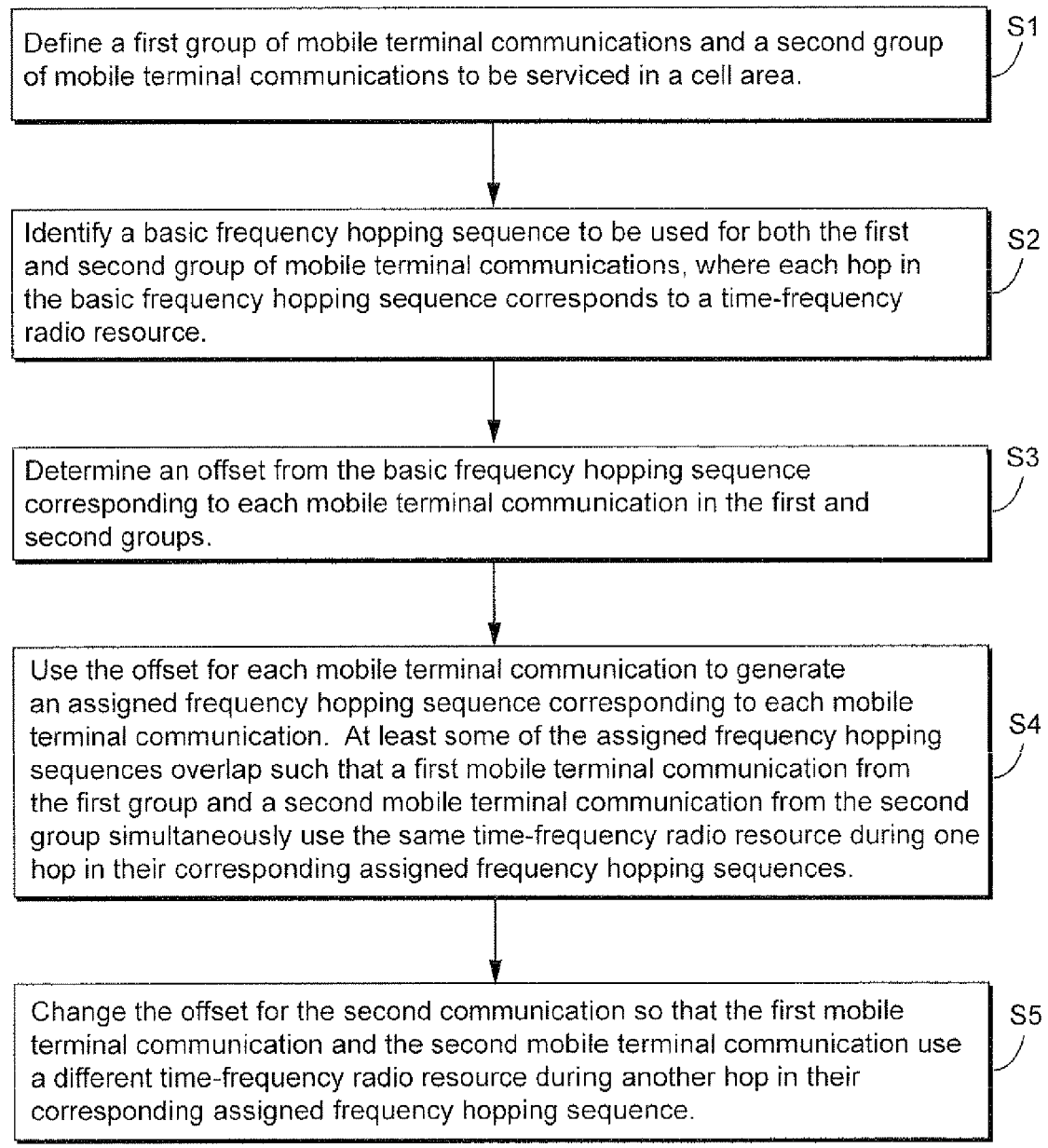
FIG. 5 is a flowchart illustrating non-limiting example steps for varying a frequency hopping offset for certain mobiles to improve interference diversity in a MUROS type system.

Reference is now made to the flowchart diagram in FIG. 5 illustrating non-limiting example steps for varying a frequency hopping offset for certain mobiles to improve interference diversity in a MUROS type system. A first group of mobile terminal communications and a second group of mobile terminal communications to be serviced in a cell area are defined (step S1). A basic frequency hopping sequence is identified to be used for both the first and second group of mobile terminal communications, where each hop in the basic frequency hopping sequence corresponds to a time-frequency radio resource (step S2). An offset from the basic frequency hopping sequence is determined corresponding to each mobile terminal communication in the first and second groups (step S3). The offset for each mobile terminal connection is used to generate an assigned frequency hopping sequence corresponding to that mobile terminal (step S4). At least some of the assigned frequency hopping sequences overlap such that a first mobile terminal communication from the first group and a second mobile terminal communication from the second group simultaneously use the same time-frequency radio resource during one hop in their corresponding assigned frequency hopping sequences. The offset for the second group is a variable offset that changes during the duration of the second mobile terminal communication so that the first terminal mobile communication and the second mobile terminal communication use a different time-frequency radio resource during another hop in their corresponding assigned frequency hopping sequence (step S5).

Figure 6:
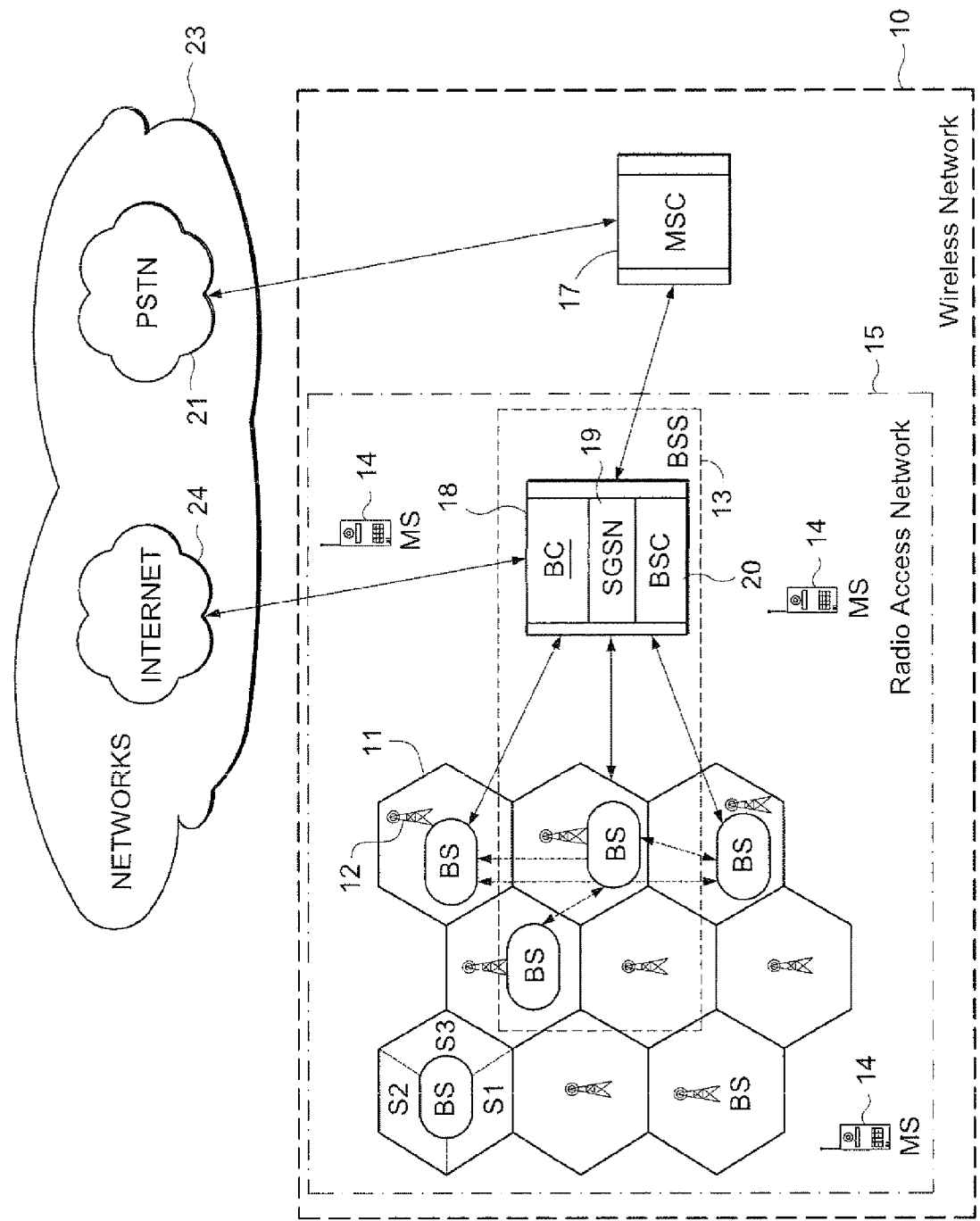
FIG. 6 is non-limiting function block diagram of a cellular radio communications system.

FIG. 6 depicts the wireless network 10 with the cells of FIG. 1 shown in expanded detail with each cell 11 having three sectors S1, S2, and S3 and a base station 12. Each of the sectors in a cell operates with the same hopping sequence number (HSN). The base stations 12 each connect to a base station controller (BSC) 20 and communicate with mobile stations MSs 14 in or near their respective cells. The BSC 20 may control the assignment of the radio resources and the operation of the cells forming the radio access network 15. The base station controller 20 may include a hopping sequence controller for controlling the frequencies used for communicating with MSs. In the GSM example embodiment, that controller uses hopping sequence numbers (HSN) and a sequence offset (MAIO) stored e.g. in memory for controlling the hopping sequences of base stations. The base controller 18 is formed of the base station controller (BSC) 20 and a Serving GPRS Support Node (SGSN) 19. The BSC has an interface, through the mobile switching center (MSC) 17 in the wireless network, with the Public Switched Telephone Network (PSTN) 21 of networks 23. The SGSN 19 is primarily responsible for mobility management in GPRS and detects mobile stations in the local area for the transmission and receipt of packets. The SGSN 19 also has an interface with the internet 24. The base controller (BC) 18, the base station controller (BSC) 20, and the SGSN 19 are part of a base station system (BSS) 13.

Figure 7:
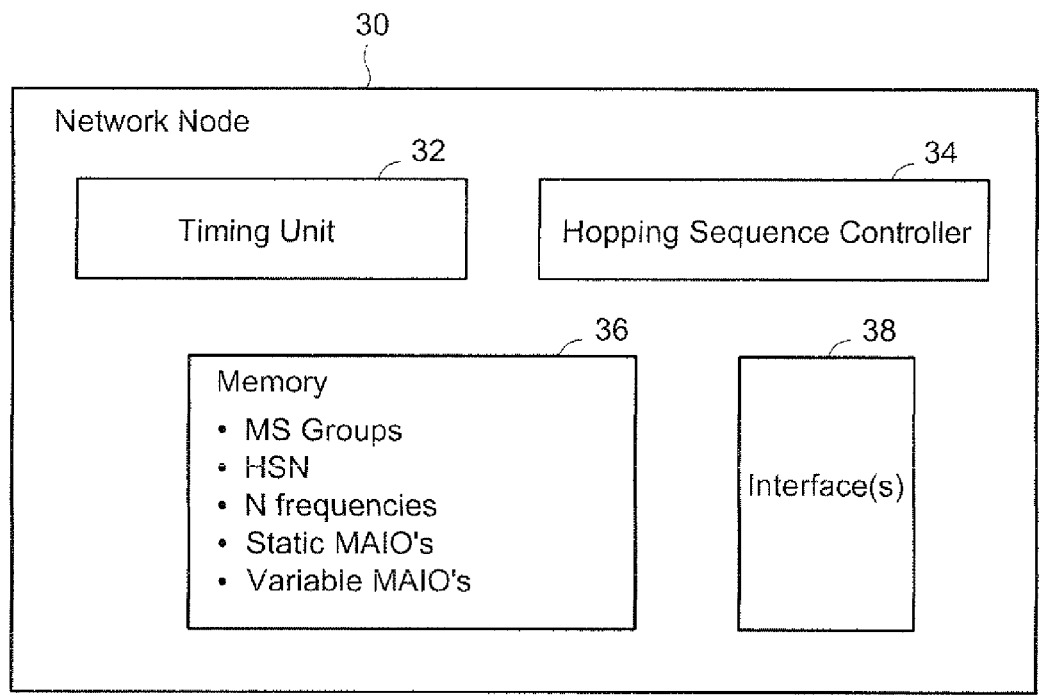
FIG. 7 is non-limiting function block diagram of a network node.

FIG. 7 is non-limiting function block diagram of a network node 30 which could be the BSC 20 or the base station 12, for example. The network node 30 includes a timing unit 32, a hopping sequence controller 34, a memory 36, and interfaces 38 to other nodes. The memory 36 stores among other things mobile terminal communication groups for each cell, hopping sequence numbers (HSNs) for each cell, a number N of hopping frequencies available in each cell, static MAIOs for use with the first group of mobile terminal communications, and variable or hopping MAIOs for use with the second group of mobile terminal communications. The hopping sequence controller 34 uses that information in memory to orchestrate frequency hopping in accordance with procedures such as those outlined above.

Figure 8:
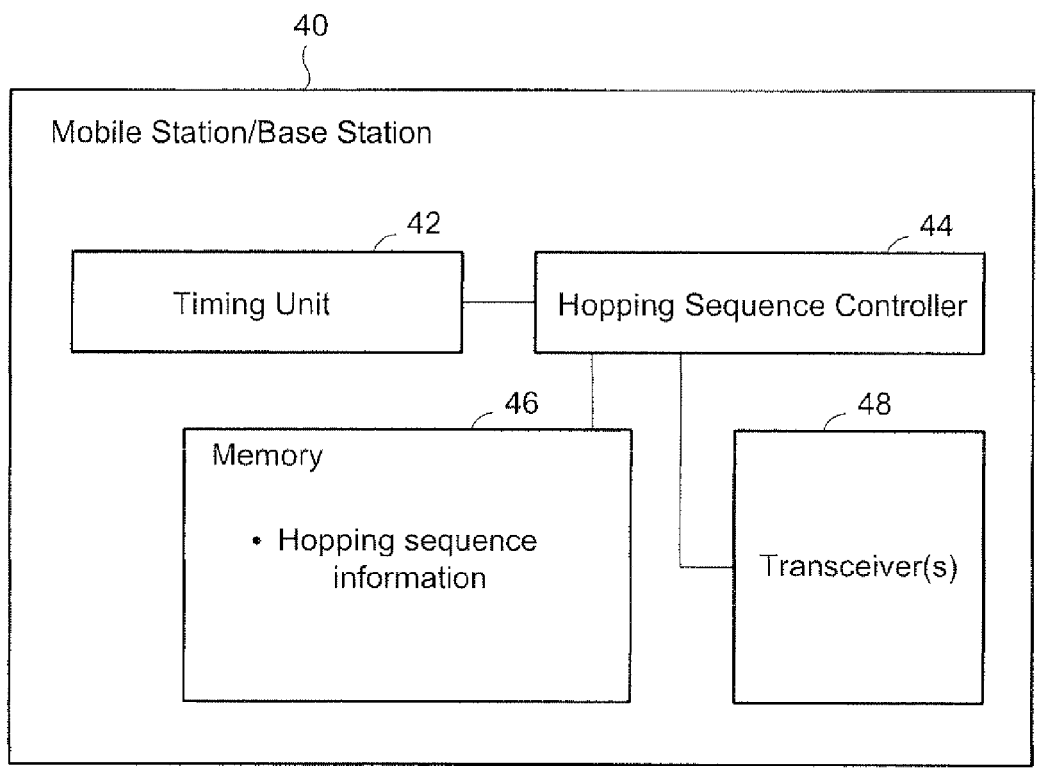
FIG. 8 is non-limiting function block diagram of a mobile station and/or base station.

FIG. 8 is non-limiting function block diagram of a node 40 such as a mobile station and/or a base station (in the situation where the network node 30 is in a base station controller). The node 40 includes a timing unit 42, a hopping sequence controller 44, a memory 46, and one or more radio transceivers 48 for communicating over a radio interface. The memory stores among other things hopping sequence information provided to it by network node 30. The hopping sequence controller 44 uses that information in memory to orchestrate frequency hopping in accordance with procedures such as those outlined above.

In the case that node 40 is a mobile terminal, the hopping sequence controller 44 implements the following procedures. It determines a basic frequency hopping sequence to be used for communication with the radio network from information received from network node 30. Each hop in the basic hopping sequence corresponds to a time-frequency radio resource. The hopping sequence controller 44 receive from the radio network radio resource information and stores it in memory 46. Using the radio resource information, the hopping sequence controller 44 determines a variable offset value from the basic frequency hopping sequence. Controller 44 determines a working frequency hopping sequence using the variable offset value and the basic frequency hopping sequence, where for one hop in the working frequency hopping sequence, the mobile radio terminal simultaneously uses the same time-frequency radio resource as another mobile radio terminal and for another hop in the working frequency hopping sequence, the mobile radio terminal simultaneously uses the same time-frequency radio resource as a different mobile radio terminal.

Figure 9:
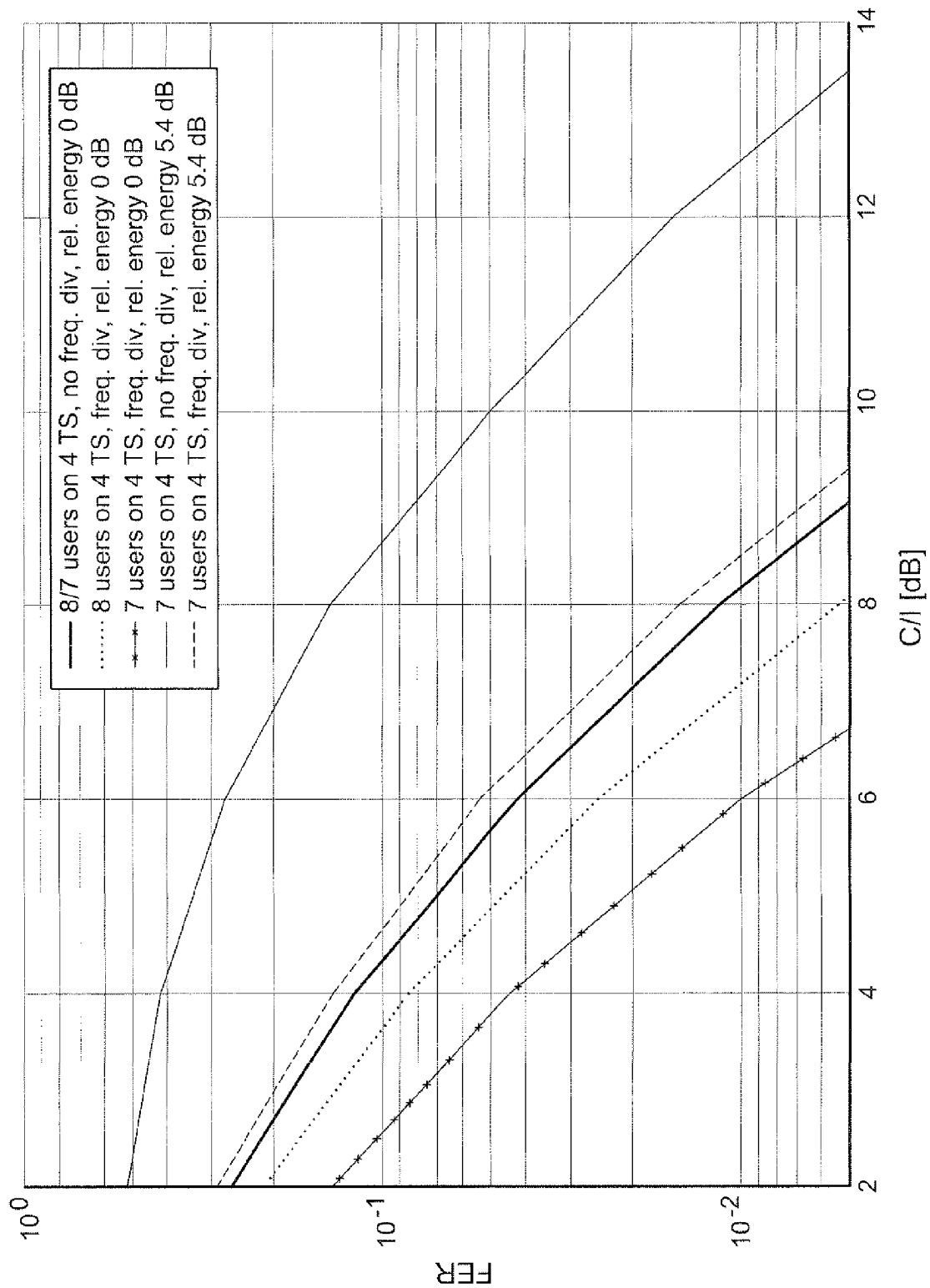
FIG. 9 illustrates simulation results for frequency hopping in systems applying MUROS.

FIG. 9 illustrates simulation results for frequency hopping in systems applying MUROS. Non-limiting example simulations were carried out using cyclic frequency hopping over 4 frequencies to demonstrate the effectiveness of this technology. Scenarios where either 8 mobile terminal users or 7 mobile terminal users are sharing 4 time slots were investigated. For a case of 8 mobile terminal users on 4 time slots, all timeslots use MUROS, but in a case of 7 mobile terminal users only 3 out of four time slots use MUROS because the odd number 7 does not permit 2-by-2 sharing for all mobile terminal users. The mobile terminals are labeled M1 to M8.

Performance of one of the sub channels was investigated. When frequency hopping scheme is applied, mobile terminal user M1 was cyclically interfered by mobile terminal users M5, M6, M7, and M8 on the second sub-channel, where mobile terminal users M2-M4 were allocated on the first sub-channel on the remaining frequencies. If no frequency hopping is applied, then the mobile terminal user M1 is always allocated together with mobile terminal user M4 on one timeslot.

Discontinuous transmission (DTX) is modeled in this example as a 2-state discrete time Markov chain where a speech activity factor and mean speech holding time can be set. A speech activity factor of 0.6 and a mean speech holding time of 5 seconds were used in the simulations. Simulations have been carried out on a TU3iFH channel using a DTS-2 interference scenario (see 3GPP TS 45.005).

It can be seen that there is a clear gain of using the MAIO frequency hopping scheme when 8 users are multiplexed on 4 time slots (TS's). A gain of approximately 1 dB can be seen at 1% frame erasure ratio (FER) (solid compared to dashed line). If only 7 mobile terminal users are allocated on the 4 TS's, then the gain increases to approximately 2 dB. Mobile terminal user M1 is always multiplexed with M5 if no frequency diversity is used, while M1 will be allocated alone on every 4 burst if frequency diversity is used (solid thicker line compared to line depicted with "x's").

In downlink (DL), different MUROS branches can have different power levels due to transmission power control. The power difference between the branches was investigated at 5.4 dB (the branch with lowest power level was investigated). In this case, the gain with the MAIO hopping scheme increases even further to 4 dB (solid thinner line compared to dashed line). The large gain is partly explained by mobile terminal M1 always being multiplexed with mobile terminal M5 if no frequency diversity is used, while mobile terminal M1 sometimes will not experience intra-channel interference in case of frequency diversity. In general, the larger the power difference is between the sub channels, the larger the gains for the weaker sub channel if the resources are fractionally-loaded.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. Reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. It is not necessary for a device or method to address each and every problem sought to be solved by the present technology, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

What is claimed is:

1. A method implemented in one or more communications nodes in a radio telecommunications system, comprising:
    defining a first group of mobile terminal communications and a second group of mobile terminal communications to be serviced in a cell area;
    identifying a basic frequency hopping sequence to be used for both the first and second group of mobile terminal communications, where each hop in the basic frequency hopping sequence corresponds to a time-frequency radio resource;
    determining an offset from the basic frequency hopping sequence corresponding to each mobile terminal communication in the first and second groups;
    using the offset for each mobile terminal communication to generate an assigned frequency hopping sequence corresponding to that mobile terminal communication;
    wherein at least some of the assigned frequency hopping sequences overlap such that a first mobile terminal communication from the first group and a second mobile terminal communication from the second group simultaneously use the same time-frequency radio resource during one hop in their corresponding assigned frequency hopping sequences, and wherein the first mobile terminal communication uses a first time-frequency radio resource during another hop in their corresponding assigned frequency hopping sequence, and wherein the second mobile terminal communication uses a second time-frequency radio resource different from the first time-frequency radio resource during the another hop in their corresponding assigned frequency hopping sequence.

2. The method of claim 1, wherein each offset associated with the first group of mobile terminal communications is a static offset value that does not change during the assigned hopping sequence, and each offset associated with the second group of mobile terminal communications is a variable offset value that changes during the assigned hopping sequence.

3. The method of claim 2, wherein varying the offset value for each mobile terminal communication in the second group improves interference diversity between the first and second groups of mobile terminal communications.

4. The method of claim 2, wherein the variable offset value for each mobile terminal communication in the second group is generated in accordance with an offset hopping pattern.

5. The method of claim 2, wherein at most two mobile terminal communications simultaneously use the same time-frequency radio channel during one hop.

6. The method of claim 2, wherein the method is performed for mobile terminal communications in the downlink direction from a radio network to the first and second groups of mobile terminals and/or is performed for mobile terminal communications in the uplink direction from the first and second groups of mobile terminals to the radio network.

7. The method in claim 2, wherein a first mobile terminal communication from the first group uses a first sub-channel of the same time-frequency radio resource during the one hop,
a second mobile terminal communication from the second group uses a second sub-channel of the same time-frequency radio resource during the one hop, and
the first and second sub-channels are at least partially orthogonal to each other.

8. The method of claim 7, wherein the variable offset values improve the fairness of distribution of inter-sub-channel interference among the first and second groups of mobile terminal communications.

9. The method in claim 2, further comprising:
signaling information to the mobile terminals in the second group to permit determination by each mobile terminal in the second group of the variable offset value for its corresponding offset during each hop in the assigned hopping sequence.

10. The method of claim 2, wherein the frequency hopping sequence is determined using a hopping sequence number (HSN), a number of hopping frequencies, and a mobile allocation index offset (MAIO), and
wherein the mobile terminal communications in the first group are each assigned a corresponding constant mobile allocation index offset (MAIO) for the assigned frequency hopping sequence and the mobile terminal communications in the second group are each assigned a corresponding variable MAIO that changes during the assigned frequency hopping sequence.

11. Apparatus implemented in one or more communications nodes in a radio telecommunications system, comprising electronic circuitry arranged to:
define a first group of mobile terminal communications and a second group of mobile terminal communications to be serviced in a cell area;
identify a basic frequency hopping sequence to be used for both the first and second group of mobile terminal communications, where each hop in the basic frequency hopping sequence corresponds to a time-frequency radio resource;
determine an offset from the basic frequency hopping sequence corresponding to each mobile terminal communication in the first and second groups;
use the offset for each mobile terminal connection to generate an assigned frequency hopping sequence corresponding to that mobile terminal communication, where at least some of the assigned frequency hopping sequences overlap such that a first mobile terminal communication from the first group and a second mobile terminal communication from the second group simultaneously use the same time-frequency radio channel during one hop in their corresponding assigned frequency hopping sequences; and
control the offset determination such that the first mobile terminal communication and the second terminal mobile communication use different a different time-frequency radio resource during another hop in their corresponding assigned frequency hopping sequence.

12. The apparatus of claim 11, wherein each offset associated with the first group of mobile terminal communications is a static offset value that does not change during the assigned hopping sequence, and each offset associated with the second group of mobile terminal communications is a variable offset value that changes during the assigned hopping sequence.

13. The apparatus of claim 12, wherein the electronic circuitry is further arranged to determine the variable offset value for each mobile terminal communication in the second group so as to improve interference diversity between the first and second groups of mobile terminal communications.

14. The apparatus of claim 12, wherein the electronic circuitry is further arranged to determine the variable offset value for each mobile terminal communication in the second group in accordance with an offset hopping pattern.

15. The apparatus of claim 12, wherein most two mobile terminal communications simultaneously use the same time-frequency radio channel during one hop.

16. The apparatus of claim 12, wherein a first mobile terminal communication from the first group uses a first sub-channel of the same time-frequency radio resource during the one hop,
a second mobile terminal communication from the second group uses a second sub-channel of the same time-frequency radio channel during the one hop, and
the first and second sub-channels are at least partially orthogonal to each other.

17. The apparatus of claim 12, wherein the variable offset values improve the fairness of distribution of inter-sub-channel interference among the first and second groups of mobile terminal communications.

18. The apparatus of claim 12, wherein the electronic circuitry is arranged to:
signal information to the mobile terminals in the second group to permit determination by each mobile terminal in the second group of the variable offset value for its corresponding offset during each hop in the assigned hopping sequence.

19. The apparatus of claim 12, wherein the electronic circuitry is arranged to:
determine the frequency hopping sequence using a hopping sequence number (HSN), a number of hopping frequencies, and a mobile allocation index offset (MAIO), and assign to mobile terminal communications in the first group a constant mobile allocation index offset (MAIO) for the assigned frequency hopping sequence and to mobile terminal communications in the second group a variable MAIO that changes during the assigned frequency hopping sequence.

20. The apparatus of claim 19, wherein the radio telecommunications system is a GSM-type system, and wherein the electronic circuitry is arranged to determine the frequency hopping sequence and offsets is located in a base station controller (BSC) for controlling one or more base transceiver stations (BTSs) that implement actual frequency hopping.

21. Apparatus for a mobile radio terminal for use in a radio telecommunications system where each radio channel is defined by a frequency hopping sequence, comprising electronic circuitry arranged to:

determine a basic frequency hopping sequence to be used for communication with a radio network, where each hop in the basic hopping sequence corresponds to a time-frequency radio resource;

receive from the radio network radio resource information;

determine, using the radio resource information, a variable offset value from the basic frequency hopping sequence; and determine a working frequency hopping sequence using the variable offset value and the basic frequency hopping sequence, where for one hop in the working frequency hopping sequence, the mobile radio terminal simultaneously uses the same time-frequency radio resource as another mobile radio terminal and for another hop in the working frequency hopping sequence, the mobile radio terminal simultaneously uses the same time-frequency radio resource as a different mobile radio terminal.

22. The apparatus of claim 21, wherein the variable offset value changes during the working frequency hopping sequence.

23. The apparatus of claim 22, wherein the frequency hopping sequence is based on a hopping sequence number (HSN), a number of hopping frequencies, and a mobile allocation index offset (MAIO), and a variable MAIO that changes during the working frequency hopping sequence.

* * * * *